United States Patent
Tanizoe et al.

(10) Patent No.: US 10,518,641 B2
(45) Date of Patent: Dec. 31, 2019

(54) CONTROL APPARATUS FOR VEHICLE

(71) Applicant: MITSUBISHI JIDOSHA KOGYO KABUSHIKI KAISHA, Tokyo (JP)

(72) Inventors: Teppei Tanizoe, Tokyo (JP); Noritaka Aoyama, Tokyo (JP); Kenji Ohmura, Tokyo (JP); Masataka Ohtsuka, Tokyo (JP); Nagamitsu Hiraoka, Tokyo (JP); Ken Hirashita, Tokyo (JP); Takahisa Fujiwara, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 15/837,329

(22) Filed: Dec. 11, 2017

(65) Prior Publication Data

US 2018/0194225 A1 Jul. 12, 2018

(30) Foreign Application Priority Data

Jan. 10, 2017 (JP) .................................. 2017-002103

(51) Int. Cl.
*B60W 50/14* (2012.01)
*B60K 35/00* (2006.01)
(Continued)

(52) U.S. Cl.
CPC ............. *B60K 35/00* (2013.01); *B60W 50/14* (2013.01); *F16H 63/40* (2013.01);
(Continued)

(58) Field of Classification Search
CPC .......... B60W 50/14; B60W 2050/146; B60W 2510/0233; B60W 2540/10; B60W 2540/103
See application file for complete search history.

(56) References Cited

U.S. PATENT DOCUMENTS 10,053,003 B2 * 8/2018 Teratani ................. B60K 37/02
10,175,144 B2 * 1/2019 Yamamoto ............. B60K 35/00
(Continued)

FOREIGN PATENT DOCUMENTS

CN        1708655 A     12/2005
CN     104176061 A     12/2014
(Continued)

OTHER PUBLICATIONS

Extended European Search Report dated May 15, 2018 in the European counterpart Patent Application No. 18150669.2.
(Continued)

*Primary Examiner* — Erin D Bishop
(74) *Attorney, Agent, or Firm* — Birch Stewart Kolasch & Birch LLP (57) ABSTRACT

The control apparatus for a vehicle includes a determination unit that determines whether or not a start condition is established, the start condition including when a torque converter is in a lockup state, and when the vehicle is in an accelerating state; and a display control unit that causes an acting number of rotations to be displayed on a tachometer instead of an actual number of rotations when it is determined by the determination unit that the start condition is established. The display control unit calculates the acting number of rotations based on a target value of an input number of rotations of a continuously variable transmission, and varies the acting number of rotations with a rate of change having an absolute value that is greater than an absolute value of a rate of change of the actual number of rotations upon an abrupt change in the target value.

12 Claims, 5 Drawing Sheets

(51) Int. Cl.
*G01M 15/04* (2006.01)
*F16H 63/40* (2006.01)
*F16H 61/662* (2006.01)
*F16H 61/66* (2006.01)

(52) U.S. Cl.
CPC ....... *G01M 15/046* (2013.01); *B60K 2370/52* (2019.05); *B60W 2050/146* (2013.01); *B60W 2510/0233* (2013.01); *B60W 2540/103* (2013.01); *F16H 61/662* (2013.01); *F16H 2061/6611* (2013.01)

(56) References Cited

U.S. PATENT DOCUMENTS

| | | |
|---|---|---|
| 2015/0175004 A1 | 6/2015 | Yasunaga et al. |
| 2016/0107652 A1 | 4/2016 | Kim et al. |
| 2016/0138468 A1 | 5/2016 | Shibata et al. |

FOREIGN PATENT DOCUMENTS

| | | |
|---|---|---|
| CN | 105378489 A | 3/2016 |
| CN | 105522927 A | 4/2016 |
| JP | 2015-161654 A | 9/2017 |

OTHER PUBLICATIONS

Chinese Office Action and Search Report for Chinese Application No. 201810010059.7, dated Mar. 29, 2019, with partial English translation.
Chinese Office Action for Chinese Application No. 201810010059.7, dated Sep. 10, 2019, with English translation.

\* cited by examiner

CONTROL APPARATUS FOR VEHICLE

CROSS-REFERENCE TO THE RELATED APPLICATION

This application incorporates by references the subject matter of Application No. 2017-002103 filed in Japan on Jan. 10, 2017 on which a priority claim is based under 35 U.S.C. § 119(a).

FIELD

The present invention relates to a control apparatus for a vehicle that carries out a control to modify a display of a tachometer when a torque converter in a lock-up state, and when the vehicle is in an accelerating state.

BACKGROUND

A vehicle is provided with a tachometer for indicating the number of rotations of an engine, and a driver can recognize the number of rotations of the engine by checking the display of the tachometer. A tachometer is generally controlled on the basis of signals from a sensor that detects the actual number of rotations of the engine. For example, the value of the actual number of rotations of the engine or a value corrected by eliminating a minute fluctuation from the actual number of rotations is displayed on the tachometer. A technique is proposed which provides a tachometer display expected by a driver when an automatic transmission is shifted, by displaying, on the tachometer, a virtual number of rotations independent of the actual number of rotations of the engine upon the shift change (e.g., refer to Japanese Laid-open Patent Application No. 2015-161654).

In a vehicle having an automatic transmission including a continuously variable transmission that steplessly varies the rotation speed of an engine and a torque converter, however, the actual number of rotations of the engine varies in accordance with a change in the pulley ratio upon a shift change. Therefore, when the driver has an acceleration intention, the response of the display of the tachometer (e.g., the movement of the needle) may be delayed as compared to the response of a tachometer of a manual transmission or a stepped automatic transmission and thus the driver may not be able to have a satisfactory visually-sensible acceleration feeling.

SUMMARY

Technical Problems

The present invention has been made in the light of the aforementioned issues, and an object thereof is to provide a control apparatus for a vehicle that can improve the visually-sensible acceleration feeling of a driver when the driver has an acceleration intention. In addition to the above-identified object, it is another object of the present invention to provide advantages and effects that are derived from the elements described in the DESCRIPTION OF EMBODIMENTS discussed below, but cannot be achieved by conventional techniques.

Solution to Problems (1) A control apparatus for a vehicle disclosed therein is a control apparatus for a vehicle, the vehicle including an engine, an automatic transmission including a torque converter and a continuously variable transmission, and a tachometer that displays a value based on an actual number of rotations of the engine, the control apparatus including: a determination unit that determines whether or not a start condition is established, the start condition including when the torque converter is in a lock-up state, and when the vehicle is in an accelerating state; and a display control unit that causes an acting number of rotations to be displayed on the tachometer instead of the actual number of rotations when it is determined by the determination unit that the start condition is established, wherein the display control unit calculates the acting number of rotations based on a target value of an input number of rotations of the continuously variable transmission, and varies the acting number of rotations with a rate of change having an absolute value that is greater than an absolute value of a rate of change of the actual number of rotations upon an abrupt change in the target value.

(2) Preferably, the display control unit calculates the target value as the acting number of rotations after the acting number of rotations substantially matches the target value, when the display control unit varies the acting number of rotations with the rate of change.

(3) Preferably, upon the abrupt change in the target value includes upon a kickdown caused by an abrupt depression on an accelerator pedal, and the display control unit varies the acting number of rotations with a positive rate of change during the kickdown.

(4) Preferably, the display control unit calculates the rate of change upon the kickdown in accordance with an accelerator opening at the time when the kickdown arises. In this case, preferably the rate of change is increases as the accelerator opening increases.

(5) Preferably, the control apparatus further includes a shift change control unit that carries out a pseudo stepped upshift control to simulate a stepped shift for increasing a vehicle speed while changing a transmission ratio of the automatic transmission stepwise, wherein upon the abrupt change in the target value includes upon a shift change while the pseudo stepped upshift control is carried out by the shift change control unit, and the display control unit varies the acting number of rotations with a negative rate of change upon the shift change.

Advantageous Effects

In accordance with the control apparatus for the vehicle disclosed therein, upon an abrupt change in the target value of the input number of rotations of the continuously variable transmission, by setting the rate of change of the acting number of rotations so as to be greater than the rate of change of the actual number of rotations, a responsive display of the tachometer can be provided. As a result, when the driver has an acceleration intention (i.e., when the vehicle is in an accelerating state), it is possible to improve the visually-sensible acceleration feeling of the driver.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

A control apparatus for a vehicle as an embodiment will be described with reference to the drawings. The embodiment discussed below is merely exemplary, and it is not intended to exclude various modifications and applications of techniques not explicitly described in the following embodiment. Elements of the present embodiment may be embodied in a wide variety of modifications without departing from the spirit thereof. Further, the elements may be selectively omitted where necessary, or may be combined as appropriate.

[1. Configuration of Apparatus]

Figure 1:
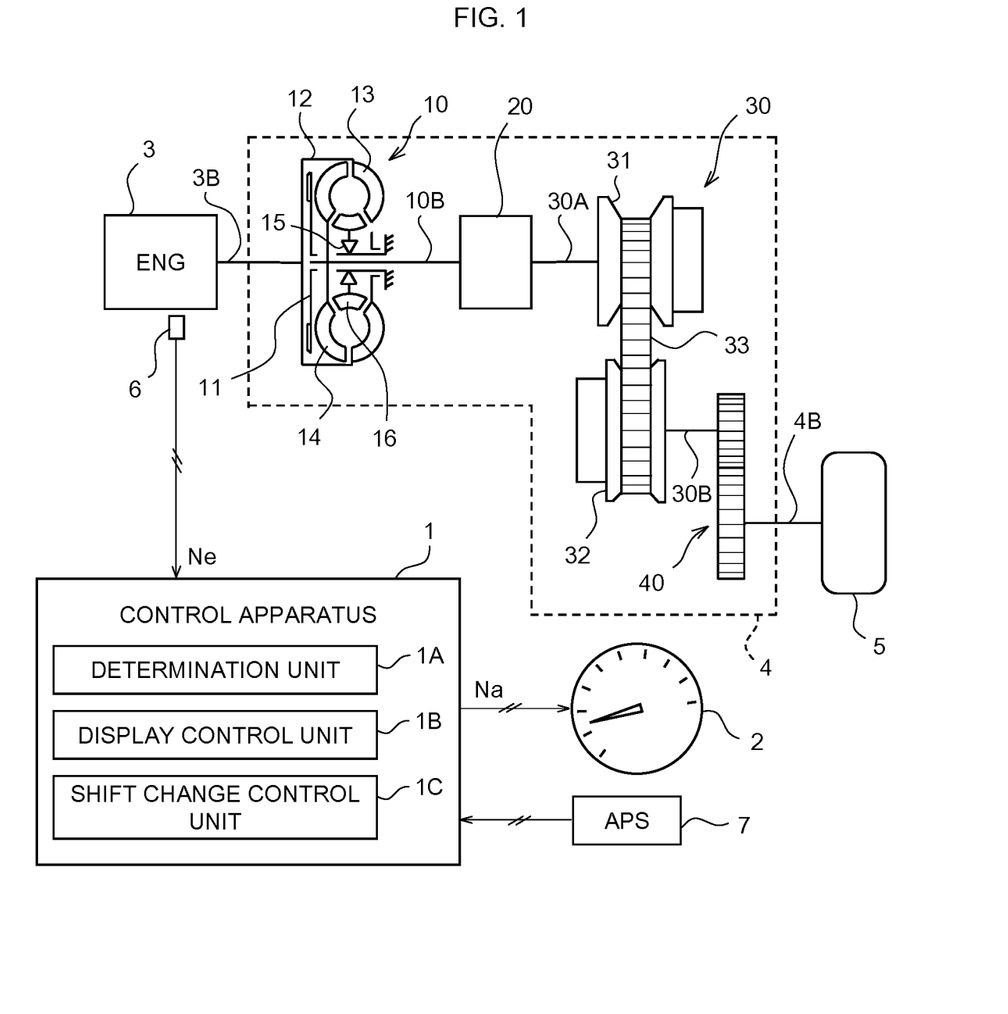
FIG. 1 is a block diagram of a control apparatus in accordance with an embodiment and a schematic diagram exemplifying a configuration of a vehicle in which this control apparatus is applied.

As shown in FIG. 1, a control apparatus 1 of the present embodiment is applied to a vehicle having an engine 3 as a driving source. The engine 3 and an automatic transmission 4 are provided in the drive system of the vehicle, and an output axis 4B of the automatic transmission 4 is connected to driving wheels 5. A tachometer 2 that displays a value based on the actual number of rotations Ne of the engine 3 is also provided at the vehicle.

The engine 3 is a typical gasoline or diesel engine, for example, and operations of the engine 3 are controlled by an engine control apparatus that is not shown.

The automatic transmission 4 is configured from a torque converter 10, a forward/backward switching mechanism 20, a belt-type continuously variable transmission mechanism 30 (hereinafter referred to as the "CVT 30"), and a set of gears 40, which are enclosed in a housing, and operations of the automatic transmission 4 are controlled by a shift change control unit 1C of the control apparatus 1, which will be described later.

The torque converter 10 is a starting element having a function to increase the torque. The torque converter 10 includes a pump impeller 13 that is coupled to an output axis 3B of the engine 3 (an input axis of the automatic transmission 4, an input axis of the torque converter 10) via a housing 12, a turbine liner 14 that is coupled to an output axis 10B of the torque converter 10 (an input axis of the forward/backward switching mechanism 20), and a stator 16 provided at a case via a one-way clutch 15.

The torque converter 10 further includes a lock-up clutch 11 to which the input axis 3B and the output axis 10B of the torque converter 10 can be directly connected. Note that the lock-up clutch 11 is coupled to the output axis 3B by a spline, and is coupled to or decoupled from the housing 12 by means of a hydraulic pressure control. Hereinafter, the state in which the lock-up clutch 11 is engaged (the state in which the engine 3 and the turbine liner 14 are directly connected) is referred to as the "lock-up state".

The forward/backward switching mechanism 20 is a mechanism to switch a rotation direction to be input to the CVT 30, between the forward direction for driving the vehicle forward and the reverse direction for driving the vehicle backward, and is configured from a planetary gear mechanism, and frictional engagement elements, such as a clutch and a brake, for example.

The CVT 30 is a mechanism to vary the ratio (i.e., transmission ratio) of the input rotation speed and the output rotation speed, of the automatic transmission 4 continuously (steplessly). The CVT 30 includes a primary pulley 31, a secondary pulley 32, and a belt 33 passed around the two pulleys 31, 32. The primary pulley 31 is provided around a primary axis 30A that is connected to the output axis 10B of the torque converter 10 via the forward/backward switching mechanism 20, and the secondary pulley 32 is provided around a secondary axis 30B parallel to the input axis 30A.

Each of the primary pulley 31 and the secondary pulley 32 includes a fixed pulley and a movable pulley that face each other and a hydraulic cylinder that moves the movable pulley to the axial direction. Hydraulic pressure provided to the respective hydraulic cylinders moves the movable pulleys of the primary pulley 31 and the secondary pulley 32, which modifies the winding radii of the belt 33, causing a continuous change of the transmission ratio. Note that the secondary axis 30B is connected to the output axis 4B of the automatic transmission 4 via the set of gears 40. After the speed is changed by the automatic transmission 4, the rotations are delivered to the driving wheels 5, and the vehicle is driven by the rotations of the wheels 5.

The tachometer 2 includes a dial plate having tick marks and a pointer swingably supported on the dial plate, and movement of the pointer is controlled by a display control unit 1B of the control apparatus 1, which will be described later. The tachometer 2 usually displays a value based on the actual number of rotations Ne (hereinafter referred to as a "value equivalent to the actual number of rotations"), except for during an acting control, which will be described later. The "value equivalent to the actual number of rotations" as used herein may be the actual number of rotations Ne, or a corrected value of the actual number of rotations Ne (e.g., a value corrected by eliminating a minute fluctuation). The tachometer 2 of the present embodiment usually displays the actual number of rotations Ne as the value equivalent to the actual number of rotations.

The vehicle is provided with a rotation number sensor 6 that detects the actual number of rotations Ne of the engine 3, and an accelerator opening sensor 7 that detects a quantity of depression of an accelerator pedal (accelerator opening). The information (the actual number of rotations Ne and the accelerator opening) detected by the sensors 6, 7 is transmitted to the control apparatus 1.

The control apparatus 1 is an electronic control apparatus that integrates and controls various devices mounted in the vehicle. The control apparatus 1 is configured as an LSI device having a microprocessor, ROMs, and RAMs integrated thereon, or a built-in electronic device, for example, and is connected to a communication line of an in-vehicle network provided in the vehicle. The control apparatus 1 of the present embodiment carries out an acting control for the tachometer 2 when a predetermined start condition is established.

[2. Summary of Control]

The acting control is a control for causing an acting number of rotations Na to be displayed on the tachometer 2, instead of the actual number of rotations Ne, when the predetermined start condition is established. The acting number of rotations Na is a virtual number of rotations calculated based on a target value of the input number of rotations of the CVT 30 (hereinafter referred to as the "target number of rotations Nt"). The acting control is carried out when the torque converter 10 is in a lock-up state and when the vehicle is in the accelerating state and the vehicle is not starting, and is terminated when the vehicle is not in the accelerating state any more.

When a driver depresses the accelerator pedal gently, the target number of rotations Nt is gradually increased. In this case, because the actual number of rotations Ne of the engine 3 gently increases in accordance with the target number of rotations Nt, there is almost no difference between the target number of rotations Nt and the actual number of rotations Ne. In the acting control of the present embodiment, when the target number of rotations Nt is changed gently, the target number of rotations Nt is set as the acting number of rotations Na (Na=Nt). This ensures the acting number of rotations Na that equals the target number of rotations Nt is displayed on the tachometer 2, and accordingly strange feeling that may be experienced by the driver can be prevented.

Figure 2:
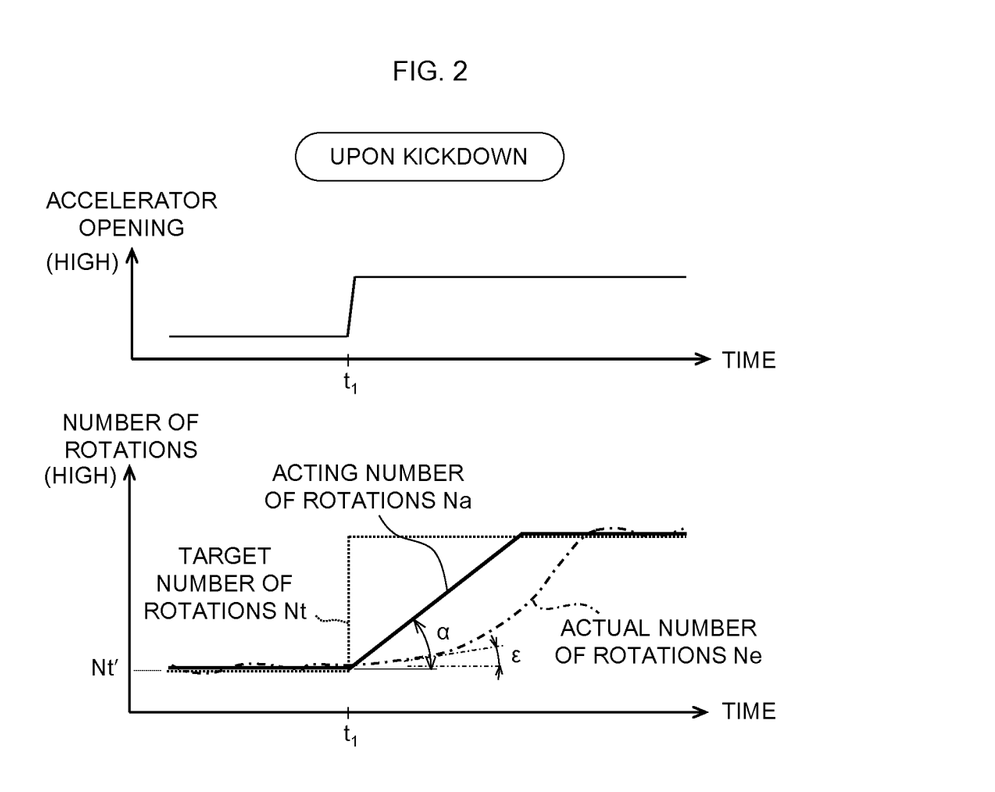
FIG. 2 shows graphs indicating a change in an accelerator opening and a change in the number of rotations upon a kickdown.

On the contrary, as shown in FIG. 2, when the driver depresses the accelerator pedal strongly, a kickdown (depression downshift) arises and the target number of rotations Nt (indicated by the dotted line in the drawing) is increased abruptly (e.g., like a step). However, because the actual number of rotations Ne of the engine 3 (indicated by the dot-and-dash line in the drawing) gently increases, the difference between the target number of rotations Nt and the actual number of rotations Ne extends. Therefore, in the acting control of the present embodiment, when it is determined that a kickdown arises, the acting number of rotations Na is varied with a rate of change $\alpha$ having an absolute value greater than the absolute value of the rate of change $\varepsilon$ of the actual number of rotations Ne.

In other words, upon an abrupt change of the target number of rotations Nt, the acting number of rotations Na is calculated such that the acting number of rotations Na is varied with a change that is greater than the change in the actual number of rotations Ne. Since the rate of change $\alpha$ to vary the acting number of rotations Na during a kickdown has a positive value, the rate of change $\alpha$ is set to a value that satisfies the relationship of $\alpha > \varepsilon$. The rate of change $\alpha$ may be selected as a variable that is set in accordance with the accelerator opening when a kickdown arises, or may be constant that is set in advance based on an experiment, a simulation, or the like.

Figure 4:
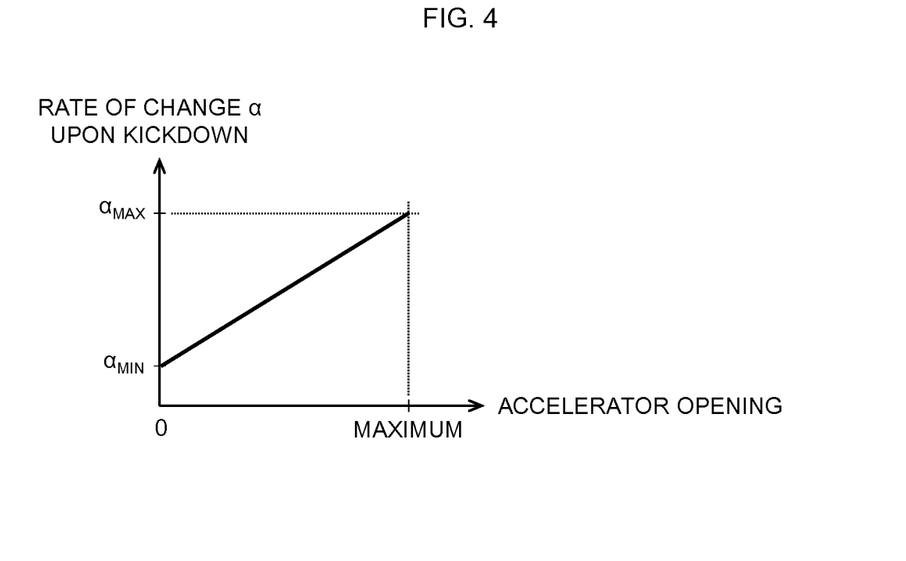
FIG. 4 is an example of a map for determining a rate of change α upon a kickdown.

When the rate of change $\alpha$ is selected as a variable, one method to set the rate of change $\alpha$ is to use a map that defines values of the rate of change $\alpha$ for various values of the accelerator opening, as shown in FIG. 4, for example. In this map, the rate of change $\alpha$ linearly increases between the minimum value $\alpha_{MIN}$ and the maximum value $\alpha_{MAX}$ of the rate of change $\alpha$, as the accelerator opening increases. In other words, the rate of change $\alpha$ increases as the accelerator pedal is depressed stronger. In the following, an example will be described in which the rate of change $\alpha$ is a constant.

In the present embodiment, a calculation of the acting number of rotations Na is repeated at predetermined time intervals $\Delta t$ (e.g., 10 milliseconds (ms) to several dozens of milliseconds). A value Nt' of the target number of rotations immediately before the target number of rotations Nt is abruptly increased (at Time $t_1$), is used as the initial value of the acting number of rotations Na. This initial value is assigned to the previously-calculated acting number of rotations Na' (hereinafter referred to as the "previous value Na'") (Na'=Nt'). Further, a value obtained by adding the product (multiplied value) of the above-described rate of change $\alpha$ and the time interval $\Delta t$, to the previous value Na', is set as the currently-calculated acting number of rotations Na (hereinafter referred to as the "current value Na") (Na=Na'+$\alpha \times$ $\Delta t$). Hereinafter, the product (multiplied value) of the rate of change $\alpha$ and the time interval it is referred to as a "first multiplied value A" (A=$\alpha \times \Delta t$).

When the value obtained by adding the first multiplied value A to the previous value Na' is less than the target number of rotations Nt, that value (Na'+A) is set as the current value Na and is displayed on the tachometer 2. In contrast, when the value obtained by adding the first multiplied value A to the previous value Na' is equal to or greater than the target number of rotations Nt, the target number of rotations Nt is set as the current value Na and is displayed on the tachometer 2. In other words, after the acting number of rotations Na substantially matches the target number of rotations Nt, the target number of rotations Nt is set as the acting number of rotations Na (Na=Nt). This ensures that the change of the acting number of rotations Na indicated by the thick solid line in FIG. 2 is displayed on the tachometer 2, and accordingly, it is possible to give more responsive impressions to the driver as compared to cases in which the actual number of rotations Ne is displayed. Note that the term "substantially match" as used herein means that the absolute value of the difference between the acting number of rotations Na and the target number of rotations Nt becomes less than the first multiplied value A (=$\alpha \times \Delta t$).

The vehicle of the present embodiment is also provided with a drive mode in which a pseudo stepped upshift control is carried out for increasing a vehicle speed while the transmission ratio of the automatic transmission 4 is varied stepwise by simulating stepped shifts. This drive mode is selected (set) in response to an operation by the driver, for example. Under the pseudo stepped upshift control, the transmission ratio does not steplessly vary, but the transmission ratio varies stepwise, as if a stepped transmission, such that the vehicle speed is increased while the actual number of rotations Ne of the engine 3 repeats gradual increases and sudden reductions.

Figure 3:
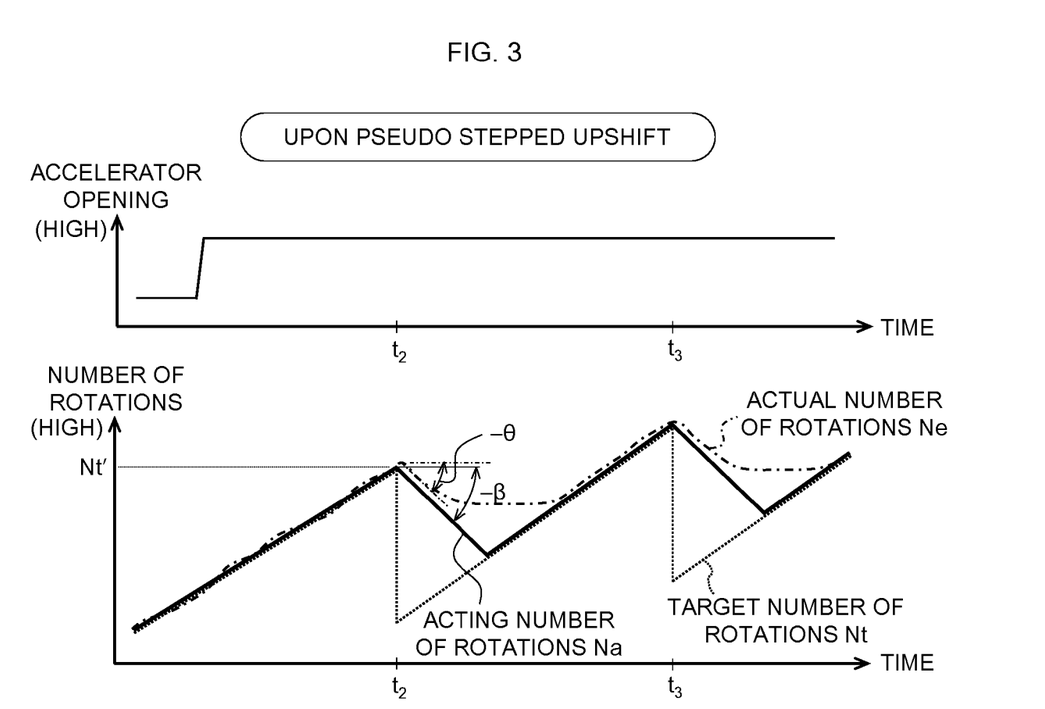
FIG. 3 shows graphs indicating a change in the accelerator opening and a change in the number of rotations upon a pseudo stepped upshift.

As shown in FIG. 3, when a pseudo stepped upshift control is carried out, the target number of rotations Nt (indicated by the dotted line in the drawing) upshifts while repeating increases at a constant gradient (gradual increases) and steep dives (sudden reductions). Note that the time when the target number of rotations Nt suddenly drops (Time $t_2$, $t_3$) is the time of a shift change. However, because the actual number of rotations Ne of the engine 3 (indicated by the dot-and-dash line in the drawing) gently drops after the shift change, the difference between the target number of rotations Nt and the actual number of rotations Ne extends. Hence, in the acting control of the present embodiment, when it is determined that a pseudo stepped upshift (pseudo stepped shift) arises, the acting number of rotations Na is varied with a rate of change $-\beta$ having an absolute value that is greater than the absolute value of the rate of change $-\theta$ of the actual number of rotations Ne.

In other words, upon an abrupt change of the target number of rotations Nt, the acting number of rotations Na is calculated such that the acting number of rotations Na is varied with a change that is greater than the change in the actual number of rotations Ne. The rate of change $-\beta$ for varying the acting number of rotations Na while the pseudo stepped upshift control is carried out assumes a negative value. Hence, the rate of change $-\beta$ is set in advance based on an experiment, a simulation, or the like, for example, such that the absolute value $\beta$ of the rate of change $-\beta$ is greater than the absolute value $\theta$ of the rate of change $-\theta$ of the actual number of rotations Ne (the relationship of $\beta > \theta$ is satisfied).

As set forth above, in the present embodiment, the acting number of rotations Na is calculated at predetermined time intervals Δt. The value of the acting number of rotations Nt' immediately before the target number of rotations Nt suddenly decreases (e.g., at Time $t_2$) is used as the initial value of the acting number of rotations Na. This initial value is assigned to the previous value Na' (Na'=Nt') in the similar manner upon a kickdown. In addition, a value obtained by adding the product (multiplied value) of the rate of change −β and the time interval Δt, to the previous value Na', is set as the current value Na (Na=Na'+(−β×Δt)). Hereinafter, the product (multiplied value) of the absolute value β of the rate of change −β and the time interval Δt is referred to as the "second multiplied value B" (B=β×Δt).

When a value obtained by subtracting the second multiplied value B from the previous value Na' is greater than the target number of rotations Nt, that value (Na'−B) is set and displayed on the tachometer 2 as the current value Na. In contrast, when the value obtained by subtracting the second multiplied value B from the previous value Na' is equal to or less than the target number of rotations Nt, the target number of rotations Nt is set and displayed on the tachometer 2 as the current value Na. In other words, after the acting number of rotations Na substantially matches the target number of rotations Nt, the target number of rotations Nt is set as the acting number of rotations Na (Na=Nt). This ensures that the change in the acting number of rotations Na indicated by the thick solid line in FIG. 3 is displayed on the tachometer 2, and accordingly, it is possible to give more responsive impressions to the driver as compared to cases in which the actual number of rotations Ne is displayed. Note that the term "substantially match" as used herein means that the absolute value of the difference between the acting number of rotations Na and the target number of rotations Nt becomes less than the second multiplied value B (=β×Δt).

[3. Control Configuration]

The control apparatus 1 of the present embodiment is provided with a determination unit 1A, a display control unit 1B, a shift change control unit 1C, as elements for carrying out the acting control described above. These elements represent a part of functions of a program executed on the control apparatus 1, and it is assumed that they are embodied by software. Note that a part or all of those functions, however, may be embodied by hardware (electronic circuits), or may be embodied by a combination of software and hardware.

The determination unit 1A is configured to determine whether or not the start condition and an end condition of the acting control are established. The determination unit 1A determines that the start condition is established when the both of the following Condition 1 and Condition 2 are established:

==Start Condition==

Condition 1: the torque converter 10 is in the lock-up state
Condition 2: the vehicle is in an accelerating state Condition 2 is determined as being established when the accelerator opening is equal to or greater than a predetermined opening, when the depressed speed of the accelerator pedal (accelerator opening speed) is equal to or greater than a predetermined speed, or when the rate of change of the vehicle speed is equal to or greater than a predetermined value, for example. Note that the determination unit 1A determines that the end condition is established when Condition 2 described above is not established any more during the acting control. In other words, the end condition is that "the vehicle is not in an accelerating state", which is determined based on the accelerator opening, the accelerator opening speed, the rate of change of the vehicle speed, and the like.

The display control unit 1B is configured to carry out the acting control described above when it is determined by the determination unit 1A that the start condition is established. The display control unit 1B calculates (determines) the acting number of rotations Na based on the target number of rotations Nt, and also calculates (determines) the acting number of rotations Na upon an abrupt change of the target number of rotations Nt such that the acting number of rotations Na is varied with a change that is greater than the change in the actual number of rotations Ne (i.e., such that the absolute value of the rate of change of the acting number of rotations Na is greater than the absolute value of the rate of change of the actual number of rotations Ne).

An abrupt change of the target number of rotations Nt includes when a kickdown arises and while the pseudo stepped upshift control is carried out, as described above. The display control unit 1B determines whether a kickdown arises, whether a pseudo stepped upshift arises, or whether none of them arises, based on a sudden increase or an abrupt change in the accelerator opening, the accelerator opening speed, or the target number of rotations Nt.

When the display control unit 1B determines that a kickdown arises, the display control unit 1B varies the acting number of rotations Na with the positive rate of change α upon a shift change of the kickdown. After the acting number of rotations Na substantially matches the target number of rotations Nt, the display control unit 1B calculates the target number of rotations Nt as the acting number of rotations Na. In other words, the display control unit 1B causes the acting number of rotations Na that varies with the rate of change α to be displayed on the tachometer 2 until the acting number of rotations Na and the target number of rotations Nt substantially match after the shift change. After they substantially match, the display control unit 1B causes the acting number of rotations Na that is equal to the target number of rotations Nt to be displayed on the tachometer 2. When the rate of change α is selected as a variable that varies in accordance with the accelerator opening, the display control unit 1B may determine the rate of change α by applying the accelerator opening at the time when the kickdown arises, to the map shown in FIG. 4, for example.

In contrast, when the display control unit 1B determines that the pseudo stepped upshift control arises, the display control unit 1B varies the acting number of rotations Na with the negative rate of change −β upon a shift change of the pseudo stepped upshift. After the acting number of rotations Na substantially matches the target number of rotations Nt, the display control unit 1B calculates the target number of rotations Nt as the acting number of rotations Na. In other words, the display control unit 1B causes the acting number of rotations Na that varies with the rate of change −β to be displayed on the tachometer 2 until the acting number of rotations Na and the target number of rotations Nt substantially match after the shift change. After they substantially match, the display control unit 1B causes the acting number of rotations Na that is equal to the target number of rotations Nt to be displayed on the tachometer 2.

Note that, when the display control unit 1B determines that neither a kickdown nor a pseudo stepped upshift arises, the display control unit 1B calculates the target number of rotations Nt as the acting number of rotations Na, and causes the acting number of rotations Na (=Nt) to be displayed on the tachometer 2.

The shift change control unit 1C is configured to control operations of the automatic transmission 4, and carries out the pseudo stepped upshift control described above in the present embodiment. For example, when the drive mode for carrying out the pseudo stepped upshift control is selected by the driver, the shift change control unit 1C sets the target number of rotations Nt as indicated by the dot-and-dash line in FIG. 3, based on the accelerator opening and the accelerator opening speed, to control the transmission ratio of the CVT 30. Note that, because details of the pseudo stepped upshift control are well-known, detailed descriptions thereof will be omitted.

[4. Flowchart]

Figure 5:
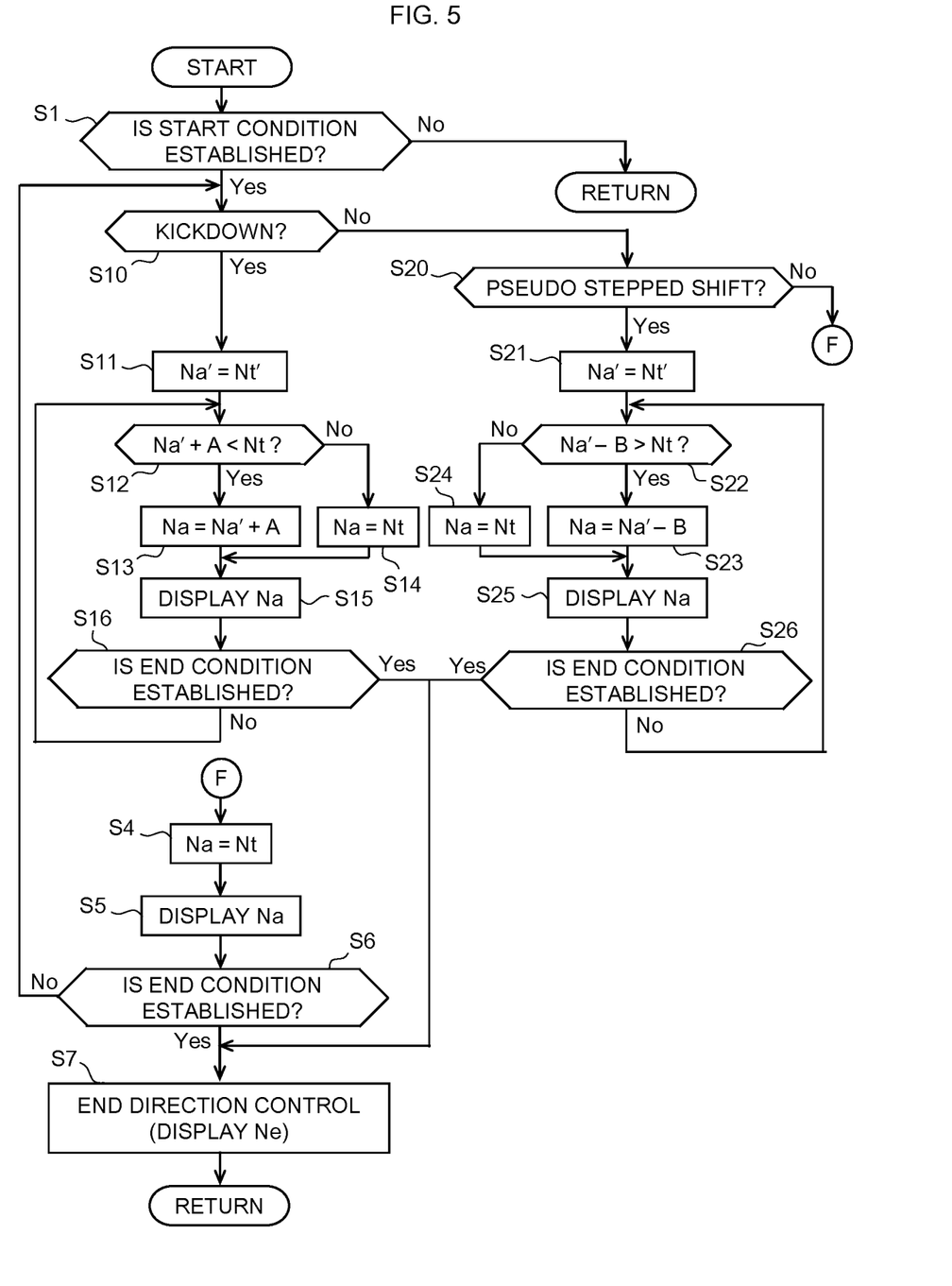
FIG. 5 is a flowchart exemplifying the content of an acting control that is carried out in the control apparatus in accordance with an embodiment.

FIG. 5 is an example of a flowchart describing the processing of the acting control described above. This flowchart is carried out at predetermined calculation cycles in the control apparatus 1 while the main power of the vehicle is turned on. This example assumes that the drive mode for carrying out the pseudo stepped upshift control is selected, and that the rate of change α is a constant. It is also assumed that information from various sensors provided at the vehicle (e.g., the rotation number sensor 6 and the accelerator opening sensor 7) and the value of the target number of rotations Nt that is set, are transmitted to the control apparatus 1 constantly.

In Step S1, it is determined whether or not the above-described start condition (the torque converter 10 is in the lock-up state and the vehicle is in an accelerating state) is established. When the start condition is not established, the flowchart returns. In contrast, when the start condition is established, it is determined whether or not a kickdown arises (Step S10). When no kickdown arises, it is subsequently determined whether or not a pseudo stepped upshift (pseudo stepped shift) arises (Step S20). When no pseudo stepped upshift arises either, the target number of rotations Nt at this point in time is calculated as the acting number of rotations Na (Step S4), and is displayed on the tachometer 2 (Step S5). It is then determined whether or not the above-described end condition is established (Step S6). When the end condition is established, the flowchart proceeds to Step S7. Otherwise, the flowchart moves back to Step S10.

When it is determined that a kickdown arises in Step S10, processing in Steps S11 to S16 (processing upon the kickdown) is carried out. Or, when it is determined that a pseudo stepped upshift arises in Step S20, processing in Steps S21 to S26 (processing upon the pseudo stepped upshift) is carried out.

In the processing upon the kickdown, initially, the target number of rotations Nt' immediately before the target number of rotations Nt is suddenly increased is set to the previous value Na' (Step S11). Thereafter, it is determined whether or not the value obtained by adding the first multiplied value A (=α×Δt) to the previous value Na' is less than the target number of rotations Nt at this point in time (Step S12). When this determination results in Yes, that value (the value obtained by adding the first multiplied value A to the previous value Na') is calculated (set) as the acting number of rotations Na (i.e., the current value) (Step S13), and the acting number of rotations Na is displayed on the tachometer 2 (Step S15).

In following Step S16, it is determined whether or not the end condition is established. When this determination results in No, the flowchart returns to Step S12, and the processing in Steps S12 to S16 are repeated. In this case, the previous value Na' to be used in Step S12 is the acting number of rotations Na that has been calculated in Step S13 before the flowchart moves back to Step S12. In Step S12, when it is determined that the value obtained by adding the first multiplied value A to the previous value Na' is equal to or greater than the target number of rotations Nt, the target number of rotations Nt at this point in time is calculated (set) as the acting number of rotations Na (Step S14), and is displayed on the tachometer 2 (Step S15). Then the flowchart proceeds to Step S7 when the determination in Step S16 results in Yes.

In the processing during a pseudo stepped upshift, processing (Steps S21 to S26) similar to the above-described processing in Steps S11 to S16 is also carried out. More specifically, the target number of rotations Nt' immediately before the target number of rotations Nt is suddenly decreased is set to the previous value Na' (Step S21), and it is determined whether or not that the value obtained by subtracting the second multiplied value B (=β×Δt) from the previous value Na' is greater than the target number of rotations Nt at this point in time (Step S22). When this determination results in Yes, that value (Na'−B) is calculated (set) as the acting number of rotations Na (i.e., the current value) (Step S23), and is displayed on the tachometer 2 (Step S25). Then, it is determined whether or not the end condition is established (Step S26).

The processing in Steps S22 to S26 is repeated until the end condition is established. In this case, the previous value Na' to be used in Step S22 is the acting number of rotations Na that has been calculated in Step S23 before the flowchart moves back to Step S22. In Step S22, when it is determined that the value obtained by subtracting the second multiplied value B from the previous value Na' is equal to or less than the target number of rotations Nt, the target number of rotations Nt at this point in time is calculated (set) as the acting number of rotations Na (Step S24), and is displayed on the tachometer 2 (Step S25). Then, when the determination in Step S26 results in Yes, the flowchart proceeds to Step S7. In Step S7, the acting control is terminated, and the actual number of rotations Ne is displayed on the tachometer 2.

[5. Advantageous Effects]

(1) In accordance with the control apparatus 1 described above, when the above-described start condition is established, because the acting number of rotations Na calculated based on the target number of rotations Nt is displayed on the tachometer 2, instead of the actual number of rotations Ne, a stable display of the tachometer 2 can be provided, regardless of a behavior of the actual number of rotations Ne. Furthermore, upon an abrupt change of the target number of rotations Nt, by setting the absolute value of the rate of change of the acting number of rotations Na so as to be greater than the absolute value of the rate of change of the actual number of rotations Ne, a responsive display of the tachometer 2 can be provided. As a result, when the driver has an acceleration intention, it is possible to improve the visually-sensible acceleration feeling of the driver.

(2) Furthermore, when the acting number of rotations Na is varied with the above-described rate of change (e.g., α or −β), the target number of rotations Nt is calculated as the acting number of rotations Na after the acting number of rotations Na substantially matches the target number of rotations Nt. As a result, it is possible to provide the responsive display of the tachometer 2 only in appropriate time span.

(3) The timing when the target number of rotations Nt is abruptly changes includes when a kickdown is triggered by an abrupt depression on the accelerator pedal. As shown in FIG. 2, when the accelerator pedal is abruptly depressed (at Time $t_1$), the actual number of rotations Ne of the engine 3 (indicated by the dot-and-dash line in the drawing) increases smoothly although the target number of rotations Nt (indicated by the dotted line in the drawing) is suddenly increased in a substantial step shape. In this case, if the actual number of rotations Ne is displayed on the tachometer 2, the driver would not be able to have visually-sensible acceleration feeling even when the vehicle is accelerating because the display of the tachometer 2 changes slowly. As a result, the driver may experience strange feeling.

In contrast, in accordance with the control apparatus 1 described above, the acting number of rotations Na, which varies with a change that is greater than the change in the actual number of rotations Ne, is displayed on the tachometer 2 upon a kickdown. Therefore, the display of the tachometer 2 becomes responsive to the actual vehicle behavior (shift feeling). As a result, strange feeling that may be experienced by the driver can be prevented, and it is possible to improve the visually-sensible acceleration feeling of the driver.

(4) Further, with a configuration to calculate the rate of change α of the acting number of rotations Na at that time in accordance with accelerator opening, it is possible to provide the display of the tachometer 2 that is closer to the actual vehicle behavior.

(5) Furthermore, upon the abrupt change of the target number of rotations Nt includes upon a shift change while a pseudo stepped upshift control is carried out. As shown in FIG. 3, when the drive mode for carrying out the pseudo stepped upshift control is selected, the target number of rotations Nt (indicated by the dotted line in the drawing) repeats gradual increases and sudden reductions in response to depressions of the accelerator pedal. However, the actual number of rotations Ne of the engine 3 (indicated by the dot-and-dash line in the drawing) smoothly declines even when the target number of rotations Nt decreases suddenly. In such a case, if the actual number of rotations Ne is displayed on the tachometer 2, the driver would not be able to have visually-sensible acceleration feeling.

In contrast, in accordance with the control apparatus 1 described above, the acting number of rotations Na, which varies with a change that is greater than the change of the actual number of rotations Ne, is displayed on the tachometer 2 upon a shift change while the pseudo stepped upshift control is carried out. Therefore, the display of the tachometer 2 becomes responsive, and the driver can have a shift feeling similar to that of a stepped transmission also from the display of the tachometer 2. As a result, it is possible to improve the visually-sensible acceleration feeling of the driver.

[6. Miscellaneous]

Although an embodiment has been described above, the above-described embodiment may be embodied in a wide variety of modifications without departing from the purpose thereof. The elements of the above-described embodiment may be selectively omitted where necessary, or may be combined as appropriate.

While the above-described embodiment has been descried using the example in which upon an abrupt change of the target number of rotations Nt includes upon a kickdown and upon a shift change while the pseudo stepped upshift control is carried out, either one of them may be included. For example, when only the former is included, the control apparatus 1 may be configured not to carry out the pseudo stepped upshift control.

The start condition and the end condition of the acting control described above are merely exemplary, and a condition other than the above-described ones (e.g., the vehicle speed is equal to or greater than a predetermined speed) may be added to one start condition. Furthermore, the method of calculating the acting number of rotations Na described above is merely exemplary, and the above-described method is not limiting. It is suffice that the acting number of rotations Na is calculated based on at least the target number of rotations Nt, and that the acting number of rotations Na varies with a change that is greater than the change in the actual number of rotations Ne upon an abrupt change of the target number of rotations Nt.

Furthermore, the map (FIG. 4) for determining (calculating) the rate of change α upon a kickdown is merely exemplary, and a map in which the rate of change α increases along a curve with an increase in the accelerator opening may be used, for example. Alternatively, the rate of change α may be calculated with a mathematical formula, instead of the map.

Note that the configuration of the tachometer 2 is not particularly limited. For example, the tachometer 2 may have a configuration in which tick marks and a pointer are both displayed on a liquid-crystal display, or a numerical value may be displayed instead of tick marks and a pointer.

The invention thus described, it will be obvious that the same may be modified in many ways. Such variations are not to be regarded as a departure from the spirit and scope of the invention, and all such modifications as would be obvious to one skilled in the art are intended to be included within the scope of the following claims.

The invention claimed is:

1. A control apparatus for a vehicle, the vehicle having an engine, an automatic transmission including a torque converter and a continuously variable transmission, and a tachometer that displays a value based on an actual number of rotations of the engine, the control apparatus comprising:
   a controller and a storage storing a program that causes the controller to:
      determine whether or not a start condition is established, the start condition including when the torque converter is in a lockup state, and when the vehicle is in an accelerating state; and
      cause an acting number of rotations to be displayed on the tachometer instead of the actual number of rotations when it is determined by the determination unit that the start condition is established,
   wherein the causing step calculates the acting number of rotations based on a target value of an input number of rotations of the continuously variable transmission, and varies the acting number of rotations with a rate of change having an absolute value that is greater than an absolute value of a rate of change of the actual number of rotations upon an abrupt change in the target value.

2. The control apparatus according to claim 1, wherein causing step calculates the target value as the acting number of rotations after the acting number of rotations substantially matches the target value, when the causing step varies the acting number of rotations with the rate of change.

3. The control apparatus according to claim 2, wherein upon the abrupt change in the target value comprises upon a kickdown caused by an abrupt depression on an accelerator pedal, and
   the causing step varies the acting number of rotations with a positive rate of change during the kickdown.

4. The control apparatus according to claim 3, wherein causing step calculates the rate of change upon the kickdown in accordance with an accelerator opening at the time when the kickdown arises.

5. The control apparatus according to claim 4, further comprising;
- a shift change control unit that carries out a pseudo stepped upshift control to simulate a stepped shift for increasing a vehicle speed while changing a transmission ratio of the automatic transmission stepwise,
- wherein upon the abrupt change in the target value comprises upon a shift change while the pseudo stepped upshift control is carried out by the shift change control unit, and
- the causing step varies the acting number of rotations with a negative rate of change upon the shift change.

6. The control apparatus according to claim 3, further comprising:
- a shift change control unit that carries out a pseudo stepped upshift control to simulate a stepped shift for increasing a vehicle speed while changing a transmission ratio of the automatic transmission stepwise,
- wherein upon the abrupt change in the target value comprises upon a shift change while the pseudo stepped upshift control is carried out by the shift change control unit, and
- the causing step varies the acting number of rotations with a negative rate of change upon the shift change.

7. The control apparatus according to claim 2, further comprising:
- a shift change control unit that carries out a pseudo stepped upshift control to simulate a stepped shift for increasing a vehicle speed while changing a transmission ratio of the automatic transmission stepwise,
- wherein upon the abrupt change in the target value comprises upon a shift change while the pseudo stepped upshift control is carried out by the shift change control unit, and
- the causing step varies the acting number of rotations with a negative rate of change upon the shift change.

8. The control apparatus according to claim 1, wherein upon the abrupt change in the target value comprises upon a kickdown caused by an abrupt depression on an accelerator pedal, and
- the causing step varies the acting number of rotations with a positive rate of change during the kickdown.

9. The control apparatus according to claim 8, wherein the causing step calculates the rate of change upon the kickdown in accordance with an accelerator opening at the time when the kickdown arises.

10. The control apparatus according to claim 9, further comprising:
- a shift change control unit that carries out a pseudo stepped upshift control to simulate a stepped shift for increasing a vehicle speed while changing a transmission ratio of the automatic transmission stepwise,
- wherein upon the abrupt change in the target value comprises upon a shift change while the pseudo stepped upshift control is carried out by the shift change control unit, and
- the causing step varies the acting number of rotations with a negative rate of change upon the shift change.

11. The control apparatus according to claim 8, further comprising:
- a shift change control unit that carries out a pseudo stepped upshift control to simulate a stepped shift for increasing a vehicle speed while changing a transmission ratio of the automatic transmission stepwise,
- wherein upon the abrupt change in the target value comprises upon a shift change while the pseudo stepped upshift control is carried out by the shift change control unit, and
- the causing step varies the acting number of rotations with a negative rate of change upon the shift change.

12. The control apparatus according to claim 1, further comprising:
- a shift change control unit that carries out a pseudo stepped upshift control to simulate a stepped shift for increasing a vehicle speed while changing a transmission ratio of the automatic transmission stepwise,
- wherein upon the abrupt change in the target value comprises upon a shift change while the pseudo stepped upshift control is carried out by the shift change control unit, and
- the causing step varies the acting number of rotations with a negative rate of change upon the shift change.

\* \* \* \* \*